D. W. KING ET AL

Aug. 22, 1933. ANTICAVITATION PLATE FOR OUTBOARD MOTORS Re. 18,921

Original Filed July 5, 1928

Inventors
Don W. King and
Arthur L. Lockwood

By Barnhart & Barnhart
Attorneys

Reissued Aug. 22, 1933

Re. 18,921

UNITED STATES PATENT OFFICE 18,921

ANTICAVITATION PLATE FOR OUTBOARD MOTORS

Don W. King and Arthur L. Lockwood, Jackson, Mich., assignors, by mesne assignments, to Outboard Motors Corporation, Detroit, Mich., a Corporation of Michigan Original No. 1,734,911, dated November 5, 1929, Serial No. 290,306, July 5, 1928. Application for reissue November 2, 1931. Serial No. 572,708

14 Claims. (Cl. 115—18)

The present invention pertains to a novel anti-cavitation plate for outboard motors, and the principal object is to cause the exhaust of the motor to be discharged through the plate. Such a construction results in quiet operation due to under water exhaust, reduction of exhaust back pressure due to the ejector action of the plate moving through the water, decreased drag of the plate through the water by relieving the suction behind its trailing edge, and reduction of the volume of the exhaust gas due to the cooling effect of the large surfaces of the plate in contact with the water.

At the lower end of the motor structure is the usual propeller shaft housing 5 on which is formed an anti-cavitation plate 6, preferably as an integral part of the housing and of ovoid cross section.

Figure 1:
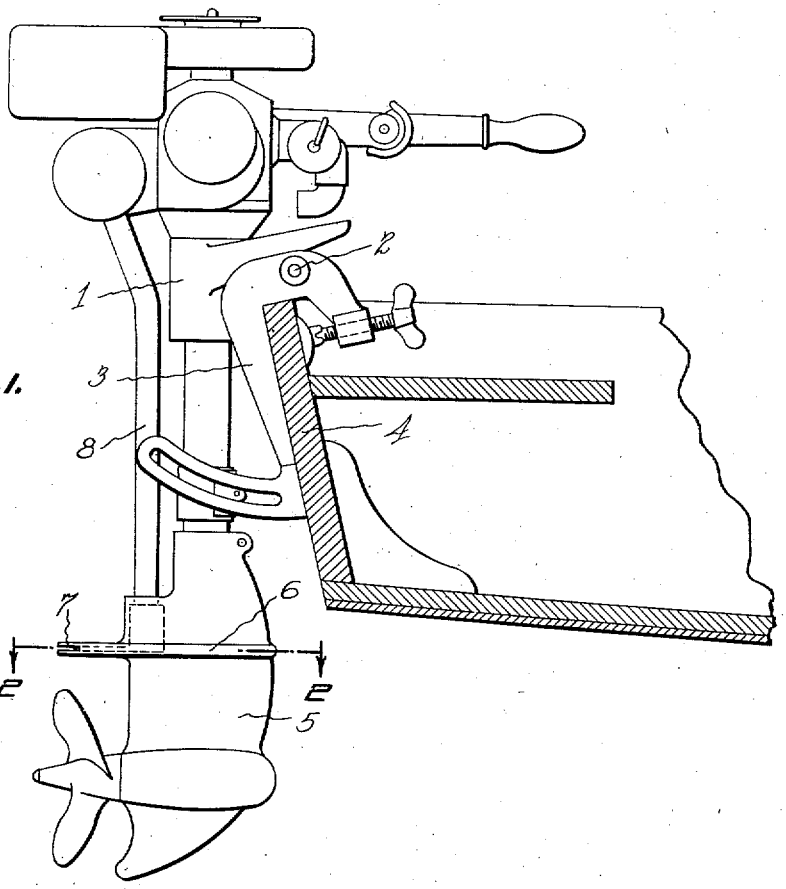

The rear or trailing end of the plate is formed with a mouth 7 beneath its upper and lower surfaces. The mouth is rather narrow at a point substantially coinciding with the center of the plate and flares outwardly and rearwardly as clearly shown in Figure 2. A pipe 8 connects the narrow or restricted portion of the mouth to the usual exhaust outlet of the motor as shown in Figure 1.

The exhaust gases are therefore conducted through the pipe 8 to the mouth from which they are discharged under water. The exhaust noise is therefore muffled, the volume of the exhaust gases are reduced by the large areas of the plate in contact with the water, and the above mentioned pressure conditions at the rear of the plate are realized.

Although a specific embodiment of the invention has been illustrated and described it will be understood that various alterations in the details of construction may be made without departing from the scope of the invention as indicated by the appended claims.

The invention is realized essentially by forming the anti-cavitation plate with a mouth in the rear or trailing edge thereof and connecting this plate to the usual exhaust pipe of the motor. The mouth preferably flares outwardly from its point of connection with the exhaust line, in order to provide for quick expansion and discharge of the exhaust gas therefrom.

The invention is fully disclosed by way of example in the following description and in the accompanying drawing, in which—

Figure 2:
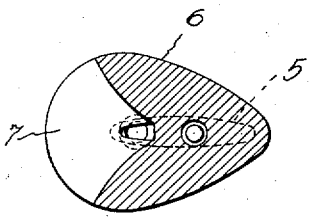

Figure 1 is a vertical elevation of an outboard motor equipped with the invention and applied to a boat; and Figure 2 is a sectional view of the anti-cavitation plate on the line 2—2 of Figure 1.

Reference to these views will now be made by use of like characters which are employed to designate corresponding parts throughout.

The numeral 1 indicates in general the usual motor structure which has a swivel connection 2 to a clamp 3 adapted for attachment to the transom 4 of a boat. The adjustments of this assembly are conventional and therefore need not be described.

What we claim is:—

1. In an outboard motor construction, an anti-cavitation plate adapted for submersion, a mouth in said plate, and an exhaust pipe from said motor connected to said mouth.

2. In an outboard motor construction, an anti-cavitation plate adapted for submersion, an outwardly flaring mouth in said plate, and an exhaust pipe from said motor connected to said mouth.

3. In an outboard motor construction, a propeller shaft housing, an anti-cavitation plate formed integral with said housing, a mouth in said plate, and an exhaust pipe from said motor connected to said mouth.

4. In an outboard motor construction, a propeller shaft housing, an anti-cavitation plate formed integral with said housing, an outwardly flaring mouth in said plate, and an exhaust pipe from said motor connected to said mouth.

5. In an outboard motor construction, an anti-cavitation plate adapted for submersion, a mouth at the rear or trailing end of said plate, and an exhaust pipe from said motor connected to said mouth.

6. In an outboard motor construction, an anti-cavitation plate adapted for submersion, a mouth at the rear or trailing end of said plate, and flaring outwardly, and an exhaust pipe from said motor connected to said mouth.

7. An outboard motor comprising the combination with an engine and drive shaft housing over a submersible lower unit of stream line contour turnable for steering and having a portion with a substantial rectilinear rearward projection provided at its rear with a narrow slot-like opening rearwardly directed and past which water divided by said stream line unit is adapted to flow with an aspirating effect irrespective of the dirigible position of said lower unit, and an exhaust pipe leading from said engine and connected with said unit to discharge through said slot whereby the motion of said unit through the water is adapted to relieve back pressure in said pipe.

8. In an outboard motor the combination with a submersible lower unit, of a shaft housing and an exhaust pipe independently connected therewith, and discharge means communicating with said exhaust pipe and comprising a substantially rectilinearly rearwardly extending member with smooth exterior walls about which the water will flow uniformly when the unit is in movement and submerged, said member having a rearwardly directed opening comprising an elongated slot in its rear margin whereby exhaust gases therein will be subject to the aspirating effect of water flowing past said member.

9. In an outboard motor the combination with a submersible lower unit, of a shaft housing and an exhaust pipe independently connected therewith, and discharge means communicating with said exhaust pipe and comprising a rearwardly extending member with smooth exterior walls about which the water will flow uniformly when the unit is in movement and submerged, said member having a rearwardly directed opening comprising a narrow and elongated slot in its rear margin whereby exhaust gases therein will be subject to the aspirating effect of water flowing past said member, said member comprising an integral part of said lower unit.

10. In an outboard motor the combination with an exhaust pipe, of a submersible member with which said pipe is connected and which comprises a vertically elongated relatively narrow body provided integrally with an exhaust passage and a rearwardly directed marginally disposed narrow slot-like mouth, said body being adapted to divide the water passing to said mouth without appreciable deflection thereof whereby said water will aspirate exhaust gases from said mouth during the movement of said body therethrough.

11. In an outboard motor assembly, the combination with a support, of a motor mounted thereon having a lower turnable unit, a drive shaft casing connecting the motor and said unit, an expansion chamber for receiving exhaust gases from the motor and means forming a passageway from the chamber to the unit separate from the casing, the lower unit having a passage communicating therewith for discharging exhaust gases at the rear of the unit and below normal water level.

12. In an outboard motor assembly, the combination with a support having a pair of spaced parallel guide arms and a thrust plate, of a motor mounted thereon having a lower turnable unit, a drive shaft casing connecting the motor and the lower unit and rotatable in the support between the said guide arms in engagement with the thrust plate, means forming an expansion chamber for receiving exhaust gases from the motor, a casing extending from the chamber to the lower unit at a distance from the drive shaft casing to allow the latter to turn between the support arms without engaging the exhaust casing, the lower unit having a passage communicating with the exhaust casing and discharging at the rear end of the unit.

13. In an outboard motor having a combustion engine and a propeller carrying gear casing, a muffler connected with the engine extending rearwardly to overlie the rearmost portion of the casing and having a discharge opening in its bottom wall, and an exhaust pipe connected to the opening, extending downwardly at the rear of the casing and open at the bottom to discharge exhaust gases below normal water level.

14. In a device of the character described, the combination with a submersible stream lined body dirigible for steering and provided at its rear with a rearwardly directed narrow slot elongated for delivery of gases into intimate contact with water flowing thereover, of an exhaust conduit communicating with said slot whereby water flowing about said body will tend to aspirate exhaust gases through said slot.

DON W. KING.
ARTHUR L. LOCKWOOD.